(12) United States Patent
ten Have (10) Patent No.: US 11,927,804 B2
(45) Date of Patent: Mar. 12, 2024

(54) WAVELENGTH DIVISION MULTIPLEXING DEVICE WITH PASSIVE ALIGNMENT SUBSTRATE

(71) Applicant: CORNING RESEARCH & DEVELOPMENT CORPORATION, Corning, NY (US)

(72) Inventor: Eric Stephan ten Have, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/686,616

(22) Filed: Mar. 4, 2022

(65) Prior Publication Data
US 2023/0280537 A1 Sep. 7, 2023

(51) Int. Cl.
*G02B 6/293* (2006.01)
*G02B 6/32* (2006.01)

(52) U.S. Cl.
CPC ..... *G02B 6/29386* (2013.01); *G02B 6/29361* (2013.01); *G02B 6/29365* (2013.01); *G02B 6/2938* (2013.01); *G02B 6/32* (2013.01)

(58) Field of Classification Search
CPC ........................ G02B 6/29361; G02B 6/29386
See application file for complete search history.

(56) References Cited

U.S. PATENT DOCUMENTS

| | | | |
|---|---|---|---|
| 5,699,464 A | 12/1997 | Marcuse et al. | |
| 5,859,717 A * | 1/1999 | Scobey | G02B 6/29367 398/79 |
| 6,301,407 B1 * | 10/2001 | Donaldson | G02B 6/29365 385/24 |
| 6,748,133 B2 * | 6/2004 | Liu | G02B 6/2938 385/24 |
| 6,883,977 B2 * | 4/2005 | Dautartas | G02B 6/4201 385/91 |
| 6,952,513 B2 * | 10/2005 | Murphy | G02B 6/262 385/33 |
| 7,215,853 B2 * | 5/2007 | Morita | H04J 14/0201 385/20 |

(Continued)

FOREIGN PATENT DOCUMENTS

| | | | | |
|---|---|---|---|---|
| WO | 2016/024991 A1 | 2/2016 | | |
| WO | WO-2019089221 A1 * | 5/2019 | ............... | G02B 6/32 |

*Primary Examiner* — Daniel Petkovsek
(74) *Attorney, Agent, or Firm* — Tamika A. Crawl-Bey (57) ABSTRACT

A wavelength division multiplexing device includes an alignment substrate configured to provide alignment between optical components of the device. The device includes a plurality of collimating lenses, and the alignment substrate includes a plurality of aligners. Each of the aligners is configured to place a respective one of collimating lenses in a predetermined position and a predetermined orientation with respect to the other collimating lenses. The alignment substrate thereby provides passive alignment of the collimating lenses with a designed optical path. The substrate may also include visual alignment markings that provide an indication of the placement of multi-layer thin film filters so that the filters define an actual optical path in alignment with the designed optical path, and integrated optical waveguides that provide an optical beam to each of the collimating lenses.

13 Claims, 10 Drawing Sheets

(56) References Cited

U.S. PATENT DOCUMENTS

| | | | |
|---|---|---|---|
| 8,724,937 B2* | 5/2014 | Barwicz | G02B 6/30 |
| | | | 385/14 |
| 9,995,880 B1 | 6/2018 | Ding et al. | |
| 10,018,787 B1 | 7/2018 | Wang et al. | |
| 10,371,897 B2* | 8/2019 | Yue | G02B 6/29379 |
| 2003/0026535 A1 | 2/2003 | Ukrainczyk | |
| 2004/0151431 A1 | 8/2004 | Ukrainczyk | |
| 2005/0031258 A1 | 2/2005 | Chiu et al. | |
| 2006/0140537 A1 | 6/2006 | Koishi | |
| 2016/0349470 A1* | 12/2016 | Cheng | G02B 6/4215 |
| 2018/0128983 A1* | 5/2018 | Huang | H04J 14/0256 |

* cited by examiner

WAVELENGTH DIVISION MULTIPLEXING DEVICE WITH PASSIVE ALIGNMENT SUBSTRATE

TECHNICAL FIELD

This disclosure relates generally to optical wavelength multiplexing, and more particularly to a wavelength division multiplexing device including passive alignment features that align one or more optical components of the device.

BACKGROUND

Optical fibers are useful in a wide variety of applications, including the telecommunications industry for voice, video, and data transmissions. Benefits of optical fibers include wide bandwidth and low noise operation. However, the need to connect network nodes with fiber-optic cables often drives the cost of fiber-optic networks, especially for fiber-optic networks having a large geographic footprint.

One way to increase the capacity of existing fiber-optic networks while avoiding the need to lay additional fiber-optic cables is through Wavelength Division Multiplexing (WDM). WDM involves transmitting data with multiple optical signals in a single optical fiber. Each optical signal has a different wavelength from the other optical signals. The single optical fiber transmits the different optical signals simultaneously in the same direction. Thus, the different optical signals provide different channels for data in the single optical fiber, and may be referred to as "signal components" or "optical carriers" of a combined optical signal or "optical beam" carried by the optical fiber. Because of their cost-effectiveness, WDM applications are increasingly being deployed to address the growing demand for bandwidth.

WDM systems require hardware to combine and separate the different optical signals at different locations in an optical network. Typically, this hardware includes a WDM device (referred to as a multiplexer) that combines the individual optical signals into one optical beam at one network location, and another WDM device (referred to as a demultiplexer) that splits the optical beam into the individual optical signals at another network location. WDM devices are often deployed in tightly confined spaces. Thus, it is desirable for the multiplexing hardware be as compact as possible.

Figure 1:
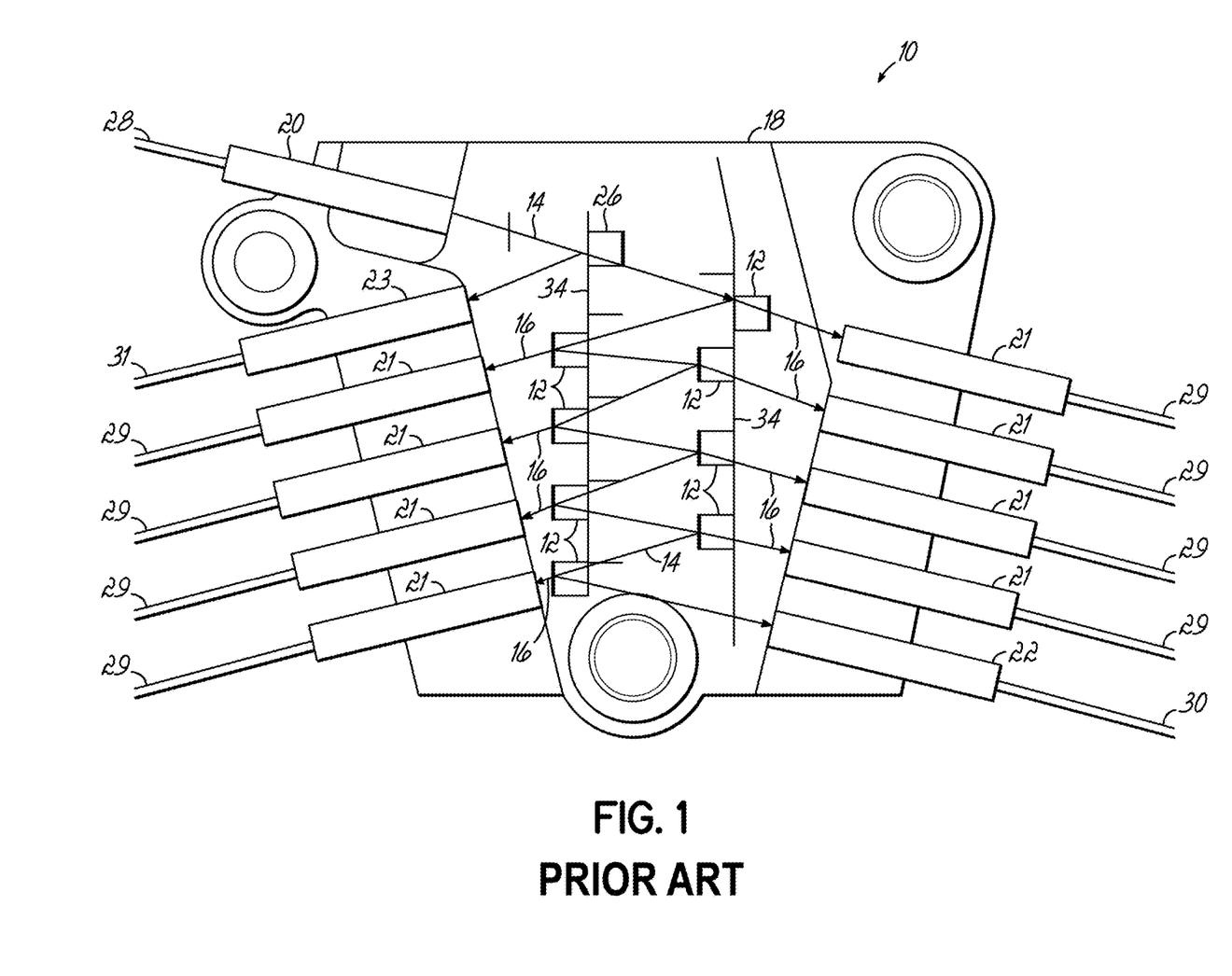
FIG. 1 is a top view of an exemplary WDM device including a plurality of filters and collimators.

FIG. 1 depicts an exemplary free-space WDM device 10 that uses a plurality of bandpass filters 12 (e.g., thin film filters) to define an optical path for an optical beam 14. The optical beam 14 may include one or more optical signals 16 (e.g., n optical signals each having a different wavelength $\lambda_n$). The WDM device 10 further includes a housing 18, a common port collimator 20, a plurality of channel port collimators 21, an expansion port collimator 22, and a tap port collimator 23. An optical splitter 26 may be placed in the optical beam 14 to reflect a portion of the optical beam 14 (e.g., a portion having an amplitude 10 to 30 dB below that of the incident optical beam 14) toward the tap port collimator 23. Each collimator 20-23 has one end that faces toward the interior of the housing 18, and another end that is operatively coupled a respective optical fiber 28-31.

The optical fiber 28 associated with the common port collimator 20 carries the optical beam 14, and may be referred to as a "common optical fiber". Each channel optical fiber 29 is configured to carry a respective portion of the optical beam 14 that includes an optical signal 16, and is associated with a respective channel port collimator 21.

The optical fiber 30 associated with the expansion port collimator 22 may carry a portion of the optical beam 14 including one or more optical signals 16 not associated with any of the channel port collimators 21. The optical fiber 31 associated with the tap port collimator 23 carries the tap signal, and may be used for testing during installation or maintenance, for example.

Each filter 12 has a passband that passes a range of wavelengths that includes the wavelength $\lambda_n$ of a respective one of the optical signals 16, and excludes the wavelengths $\lambda_n$ of the other optical signals 16. Each filter 12 transmits the portion of the optical beam 14 including the optical signal 16 having the wavelength $\lambda_n$ that falls within its passband, and reflects the portion of the optical beam 14 including the optical signals 16 having wavelengths $\lambda_n$ that fall outside its passband. By arranging the filters 12 sequentially in the optical path, each filter 12 can: (a) separate one of the optical signals 16 from the optical beam 14 and provide the separated optical signal 16 to a respective collimator 21 (demultiplexing application); and/or (b) add one of the optical signals 16 from the respective collimator 21 to the optical beam 14 (multiplexing application). Thus, WDM devices that use filters are typically bi-directional, meaning that they can both split optical signals received from an optical fiber for distribution at the network location, and combine optical signals for transmission into the optical fiber at the network location. Thus, WDM devices can be used as a multiplexer, demultiplexer, or both a multiplexer and demultiplexer.

The optical components of WDM devices are typically assembled onto a rigid surface (e.g., an inner surface of the housing 18) by an operator. To provide the operator with guidance on the position and orientation (or "placement") of the components, the rigid surface may include visual alignment markings 34 that provide a visual indication of where each optical component should be placed. Together, position and orientation define the placement of the optical component within the WDM device 10. To obtain optimal placement, i.e., a placement that optimizes performance of the WDM device, the operator may be required to actively position and orient, or "align", each of the collimators 20-23 and the filters 12 during assembly.

Due to stresses between the filtering coatings and anti-reflective coatings and the substrate of each filter 12, the surfaces of the filters 12 are slightly curved. This curvature is stronger for the side having the filtering coatings than the side having anti-reflection coatings on the backside due to the higher number of layers in the filtering coatings. Characteristics of the filters include loss (both for the reflected and transmitted beams), bandwidth, and center wavelength. The center wavelength of a filter 12 defines the range of wavelengths that are transmitted by the filter and is optimized for a particular angle of incidence at which the filter 12 is to be used. Typical angles of incidence include 13.5 degrees for a Coarse Wavelength Division Multiplexing (CWDM), such as depicted by FIG. 1, and 1.8 degrees or 4 degrees for Dense Wavelength Division Multiplexing (DWDM). Other angles of incidence may also be possible for specific applications.

Due to manufacturing tolerances and different coating designs (e.g., for different center wavelengths), the above described filter parameters show a certain degree of variation. For example, the center wavelength (which is purposely varied between filters 12 associated with different channels) may have an offset from the desired center wavelength. This center wavelength shift results in a difference between the designed "nominal" center wavelength and the measured "actual" center wavelength. The center wavelength is also dependent on the angle of incidence of the optical beam 14, and may be tuned by changing the angle of the filter 12 relative to the optical beam 14.

Figure 2:
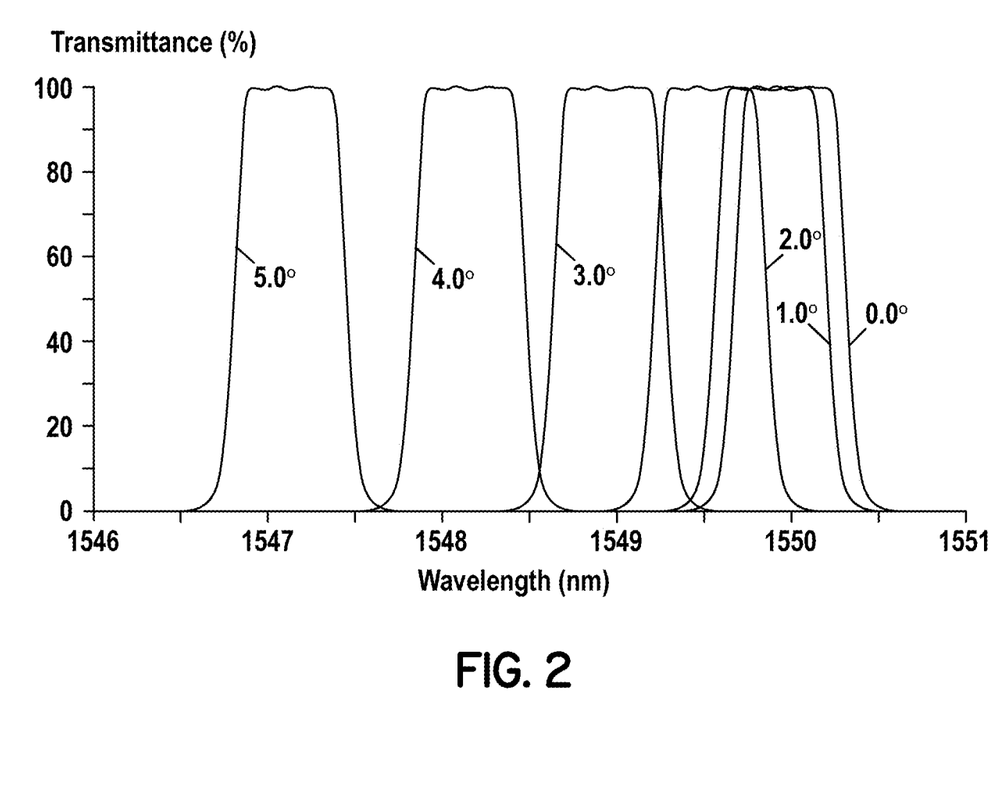
FIG. 2 is a graphical view depicting changes in the center frequency of a filter of the WDM device of FIG. 1 in response to different angular offsets from the normal angle of incidence.

By way of example, FIG. 2 depicts a graph showing the change in actual center wavelength for a filter 12 having a nominal center wavelength of 1550 nm when operating at a normal incidence (zero degrees) of the optical beam. When the angle of incidence is offset from the normal incidence by 1 degree, the actual center wavelength at which the filter 12 operates shifts to about 1549.9 nm, or about 0.10 nm shorter than the nominal center wavelength at normal incidence. As the offset in angle of incidence increases, the actual center wavelength becomes progressively shorter, and is about 0.45 nm shorter at 2 degrees, 1.00 nm shorter at 3 degrees, 1.85 nm shorter at 4 degrees, and about 2.88 nm shorter at 5 degrees. In operation, to avoid reflecting a portion of the optical beam back on itself, the designed angle of incidence is typically not zero degrees, but rather some non-zero value, e.g., 1.8, 4, or 13.5 degrees. Thus, the actual center wavelength of the filter 12 may be tuned from its nominal center wavelength to shorter or longer wavelengths by adjusting the orientation of the filter 12.

It is desirable to minimize the difference between the actual center wavelength of the filter and the wavelength of the optical signal 16 being passed by each filter 12 so that the WDM device 10 has optimum spectral performance. Accordingly, the actual center wavelength may be adjusted so that it is aligned with the center wavelength of the optical signal 16, which may be defined, for example, by the Telecommunication Standardization Sector of the International Telecommunication Union (ITU) in ITU-T G.694.1. To achieve this, the filters 12 may have to be arranged at angles different from the design angle of incidence to account for variations in the nominal center frequency of filters 12 from the design specification. Hence, active alignment of filters 12 is often needed to optimize performance of the WDM device 10.

Figure 3:
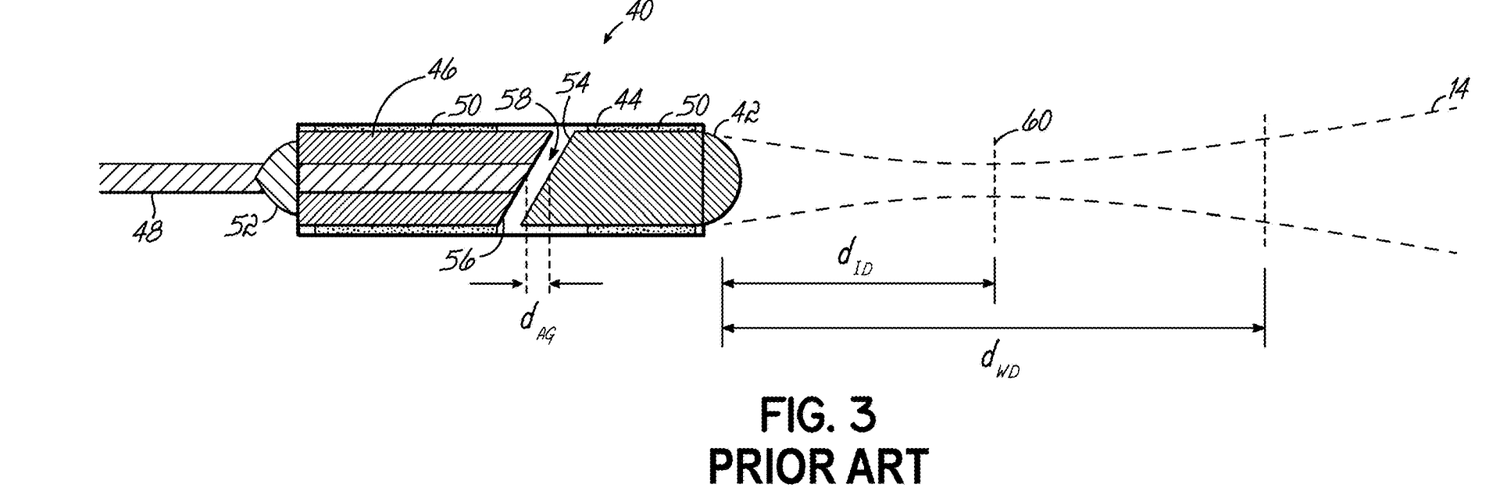
FIG. 3 is a diagrammatic cross-sectional view of a collimator of the WDM device of FIG. 1.

FIG. 3 depicts an exemplary collimator 40 including a collimating lens 42 and a housing 44. The housing 44 is configured to hold the collimating lens 42 in alignment with a ferrule 46. The ferrule 46 includes a bore which holds an optical fiber 48. The collimating lens 42 and ferrule 46 may be held in place within the housing 44 by an adhesive 50, and the optical fiber 48 may be secured to the ferrule 46 by another adhesive 52, which may be present within the bore of the ferrule 46 (not shown) and/or at a back end of the ferrule 46 (as shown in FIG. 3). The collimating lens 42 and ferrule 46 include respective interfaces 54, 56 that are separated by an air gap 58. The interfaces 54, 56 are typically oriented at an angle (e.g., an eight degree angle) to avoid light reflected from the collimating lens 42 from being reflected back into the optical fiber 48. The optical surfaces of the collimating lens 42 and optical fiber 48 may also be anti-reflection coated to minimize losses.

The air gap 58 has a length $d_{AG}$ that can be adjusted to define a working distance $d_{wD}$ and an image distance $d_{ID}$ of the collimator 40. As used herein, the image distance $d_{ID}$ refers to the distance from the collimating lens 42 to the beam waist 60. The working distance $d_{wD}$ refers to the distance at which the beam diameter behind the beam waist is equal to the diameter at the launch collimator. In the exemplary collimator 40 of FIG. 3, the working distance $d_{wD}$ is twice the image distance $d_{ID}$ on the output side of the collimator 40. The length $d_{AG}$ of the air gap 58 in each of the collimators 20-23 may be set to provide an optimum working distance $d_{wD}$ for each collimator 20-23, which may vary between collimators 20-23.

The parameters of the collimator 40 have a certain degree of variance that makes precise adjustments difficult. The bulk of this variance may be caused by the assembly tolerances of the collimator 40, e.g., rotational misalignment between the ferrule 46 and the collimating lens 42, lateral misalignment between the optical fiber 48 and the optical axis of the collimator lens 42, or an offset of the length of the air gap $d_{AG}$. These tolerances can lead to variations of the collimator working distance $d_{wD}$ and pointing angle. Thus, the optical beam 14 is often not emitted straight from the collimator 40, but at an angle, and the beam waist 60 is often not located at the desired position along the optical beam 14. As a consequence, collimators 40 also have to be actively aligned for optimum optical coupling through the WDM device 10.

The active alignment of collimators and filters make the assembly of a compact module a complex and lengthy process. Having a large number of components that need alignment also increases the chances of a mis-aligned component, which may reduce the performance of the WDM device. Thus, there is a need in the fiber optics industry for improved devices and methods for assembling WDM devices with optimized performance.

SUMMARY

In an aspect of the disclosure, an improved wavelength division multiplexing device is disclosed. The device includes a housing, a designed optical path at least partially contained within the housing, an alignment substrate associated with the housing, and a plurality of collimating lenses each having a collimator optical axis. The alignment substrate includes a plurality of aligners each configured to receive a respective collimating lens of the plurality of collimating lenses. When the respective collimating lens is received in the aligner, the collimator optical axis is aligned with the designed optical path.

In an embodiment of the disclosed device, the alignment substrate may include an upper surface, and each of the plurality of aligners may include a groove formed in the upper surface of the alignment substrate. By way of example, the groove may be V-shaped or U-shaped and sized to hold the collimating lens.

In another embodiment of the disclosed device, the alignment substrate may further include a plurality of integrated optical waveguides each having a waveguide optical axis, and when the respective collimating lens is received in the aligner, the collimator optical axis may be aligned with the waveguide optical axis of a respective integrated optical waveguide of the plurality of integrated optical waveguides.

In another embodiment of the disclosed device, the alignment substrate may further include a cavity in the upper surface that defines a lower surface, each groove formed in the upper surface of the alignment substrate may include an open end facing the cavity, and at least a portion of the designed optical path may pass through the cavity.

In another embodiment of the disclosed device, the alignment substrate may include an upper surface, and each of the plurality of aligners may include one or more projections extending from the upper surface such that the collimator optical axis of the respective collimating lens is elevated above the upper surface of the alignment substrate.

In another embodiment of the disclosed device, the device may further include a plurality of optical fibers each having an end face, and the respective collimating lens may be directly coupled to the end face of a respective optical fiber of the plurality of optical fibers. For example, the end face of the respective optical fiber may be directly coupled to the respective collimating lens by an adhesive or by welding the end face to the respective collimating lens.

In another embodiment of the disclosed device, each of the plurality of collimating lenses may include an abutment, each of the plurality of aligners may include a stop, and each of the plurality of collimating lenses may be placed in a respective predetermined position along the designed optical path when the abutment of the collimating lens is in contact with the stop of the aligner.

In another embodiment of the disclosed device, the device may further include at least one filter that defines an actual optical path for an optical beam, and the at least one filter may be configured to receive the optical beam from a first collimating lens of the plurality of collimating lenses, transmit at least a first portion of the optical beam toward a second collimating lens of the plurality of collimating lenses, and reflect at least a second portion of the optical beam toward a third collimating lens of the plurality of collimating lenses. In this embodiment, for example, the alignment substrate may further include one or more alignment markings that provide an indication of a placement of the at least one filter on the alignment substrate such that the actual optical path of the optical beam is aligned with the designed optical path.

In another aspect of the disclosure, an improved method of making a wavelength division multiplexing device is disclosed. The method includes forming the alignment substrate having the plurality of aligners, each of the plurality of aligners configured to receive a respective collimating lens of the plurality of collimating lenses such that when the respective collimating lens is received in the respective aligner, the collimator optical axis is aligned with the designed optical path.

In one embodiment, the method may further include forming the plurality of integrated optical waveguides in or on the alignment substrate each including the waveguide optical axis. Each of the aligners is configured to align the collimator optical axis of the respective collimating lens with both the designed optical path and the waveguide optical axis of the respective integrated optical waveguide of the plurality of integrated optical waveguides.

In another aspect of the disclosure, another improved method of making a wavelength division multiplexing device is disclosed and includes providing the alignment substrate having the plurality of aligners, each of the plurality of aligners configured to receive a respective collimating lens of the plurality of collimating lenses such that when the respective collimating lens is received in the respective aligner, the collimator optical axis is aligned with the designed optical path, and placing each of the plurality of collimating lenses in a respective aligner of the plurality of aligners.

In another embodiment of the disclosed method, the alignment substrate may include the plurality of integrated optical waveguides in or on the alignment substrate each including the waveguide optical axis, and placing each of the plurality of collimating lenses in the respective aligner may align the collimator optical axis of the respective collimating lens with the waveguide optical axis of a respective integrated optical waveguide of the plurality of integrated optical waveguides.

In another embodiment of the disclosed method, each collimating lens of the plurality of collimating lenses may include the abutment, each aligner of the plurality of aligners may include the stop, and the method may further include abutting the abutment of the respective collimating lens with the stop of the respective aligner. Abutting the abutment with the stop may position the respective collimating lens along the designed optical path.

In another embodiment of the disclosed method, the method may further include placing at least one filter that defines the actual optical path for the optical beam on the alignment substrate. The at least one filter may be configured to receive the optical beam from the first collimating lens of the plurality of collimating lenses, transmit at least the first portion of the optical beam toward the second collimating lens of the plurality of collimating lenses, and reflect at least the second portion of the optical beam toward the third collimating lens of the plurality of collimating lenses. In this embodiment, the alignment substrate may further include one or more alignment markings that provide the indication of the placement of the at least one filter on the alignment substrate such that the actual optical path of the optical beam is aligned with the designed optical path, and the method may further include aligning the at least one filter with a respective alignment mark of the one or more alignment marks.

In another embodiment of the disclosed method, the alignment substrate may further include the cavity in the upper surface that defines the lower surface, and at least a portion of the designed optical path may pass through the cavity.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 15A-17D are perspective views of various exemplary alignment features that may be used to provide aligners in the alignment substrates of FIGS. 5 and 8.

DETAILED DESCRIPTION

Various embodiments will be further clarified by examples in the description below. In general, the description relates to WDM devices that include a substrate configured to passively align one or more optical components of the WDM device. The WDM devices may also use collimators that all have the same fixed working distance, e.g., $d_{wD}=0$. Eliminating the need for an adjustable working distance may allow elimination of the air gap 58 applied in conventional collimators 40, such as depicted by FIG. 3. This may allow collimators to be reduced to only two components, a fiber and a collimating lens that transforms the diameter of the optical beam, or in some embodiments, just the collimating lens. The diameter of the optical beam may be adjusted such that the focusing effect of the curved surface of the filters compensates for diffractive beam widening.

Figure 4:
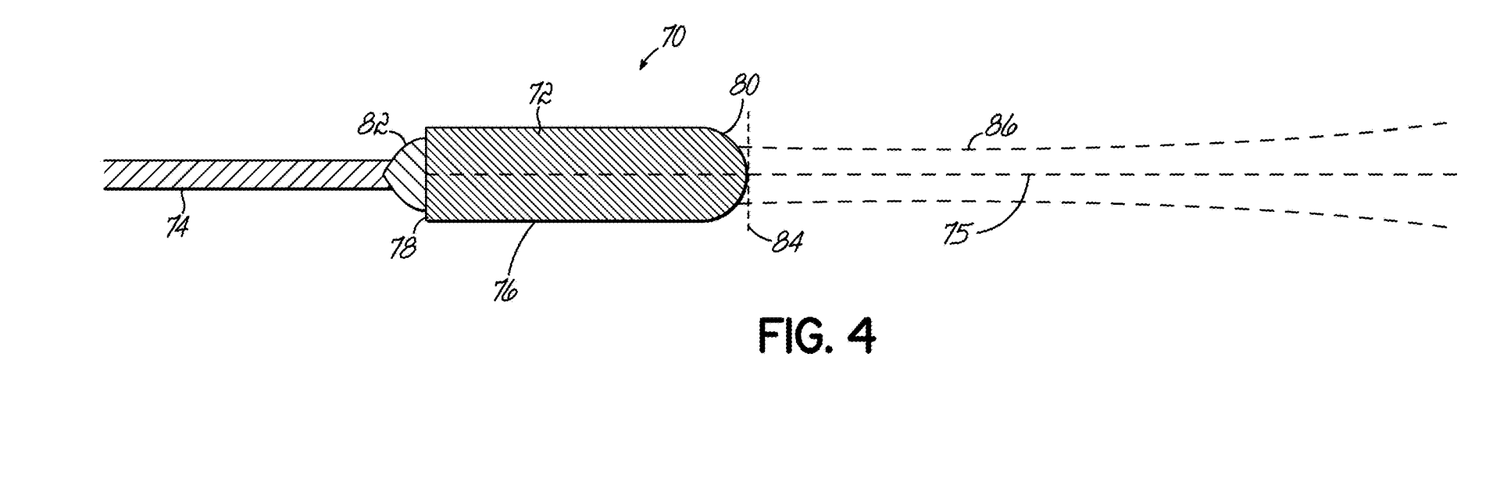
FIG. 4 is a diagrammatic cross-sectional view of another type of collimator that may be used in a WDM device which includes an alignment substrate.

FIG. 4 depicts an exemplary collimator 70 (sometimes referred to as a "fiber collimator" or "pigtail collimator") including a collimating lens 72 operatively coupled to an optical fiber 74. The collimating lens 72 includes an optical axis 75, a cylindrical surface 76, a waveguide interface surface 78, and an air interface surface 80. The waveguide interface surface 78 is joined to the air interface surface 80 by the cylindrical surface 76, and oriented at a generally orthogonal angle relative to the optical fiber 74. One end of the optical fiber 74 may be directly coupled to the waveguide interface surface 78 of collimating lens 72 by an adhesive 82 (shown) or by welding/fusing an end of the optical fiber 74 to the waveguide interface surface 78, e.g., by laser processing or an electric arc. The collimating lens 72 may be configured (e.g., by choice of refractive index, length, and radius of curvature of the air interface surface 80) so that the waist 84 of an optical beam 86 emitted by the collimator 70 is located at or proximate to the air interface surface 80. This may result in the collimator 70 having a working distance $d_{wD}=0$.

Eliminating the air gap between the collimating lens 72 and optical fiber 74 may avoid the need for a housing or ferrule. Directly coupling the collimating lens 72 to the optical fiber 74 may also produce a more accurate alignment between the optical axis 75 of collimating lens 72 and the optical fiber 74 associated with the collimating lens 72. Eliminating the collimator housing may also avoid introducing mechanical tolerances that can be a source of misalignments between the collimating lens 72 and the other optical components of the WDM device. This improvement in alignment may be due to the orientation of the collimating lens 72 within the WDM device being defined by the cylindrical surface 76 of the collimating lens 72 rather than by, with reference to FIG. 3, how accurately the collimating lens 42 and ferrule 46 are aligned with each other as well as the housing 44. Both the direct coupling of the collimating lens 72 to the optical fiber 74 and the elimination of the collimator housing 44 may reduce pointing angle misalignment as compared to the collimator 40 depicted by FIG. 3. Elimination of the collimator housing 44 may also facilitate alignment between the collimating lens 72 and one or more passive alignment features, as described in detail below.

Advantageously, the exemplary collimator 70 provides a simplified collimator structure that contributes to improved collimator quality and accuracy by avoiding the variations introduced by use of an air gap, housing, ferrule, and angled interfaces. The exemplary collimator 70 also avoids the need for anti-reflection coatings on the end-faces of the collimating lens 72 and optical fiber 74, naturally provides improved alignment between the optical fiber 74 and collimating lens 72, reduces pointing angle errors, working distance offsets, and lowers the manufacturing cost of the collimator 70. Once a relation between the cylindrical surface 76 of collimating lens 72 and the direction of the optical beam 86 is determined, alignment features may be defined with predetermined positions and orientations on a substrate such that each of the collimators 70 will be properly aligned upon assembly of the WDM device.

Figure 5:
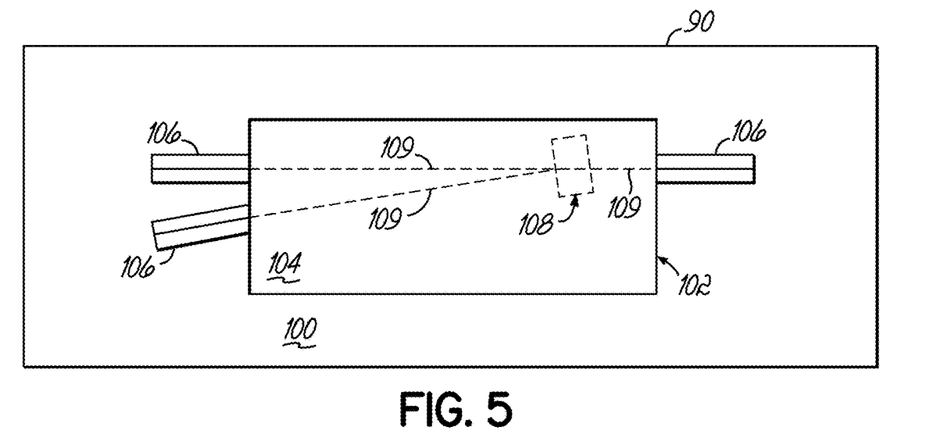
FIG. 5 is a diagrammatic view of an exemplary alignment substrate for a WDM device.
Figure 6:
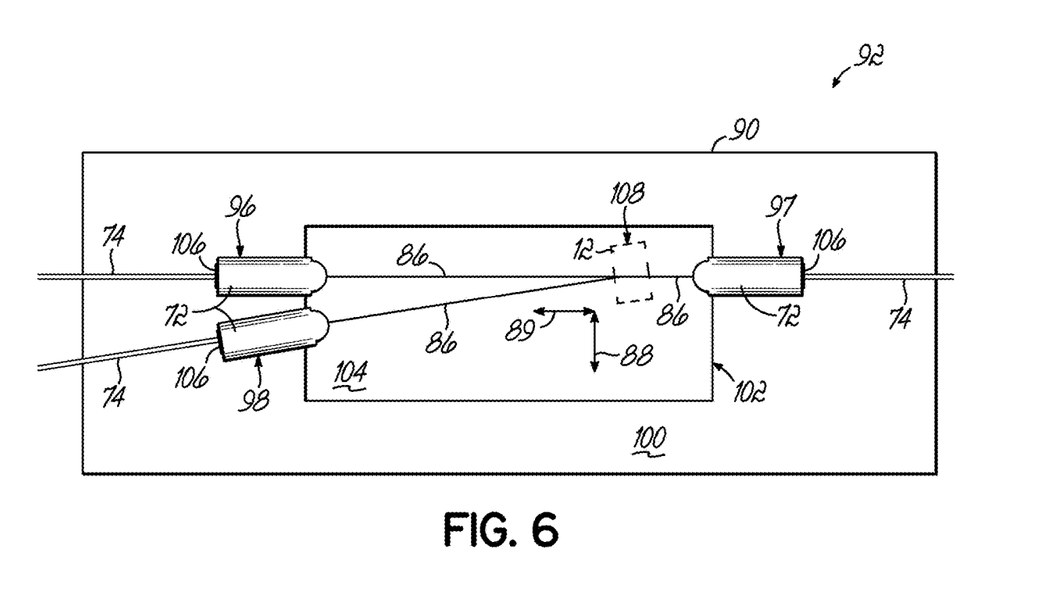
FIG. 6 is a diagrammatic view of a WDM device including the alignment substrate of FIG. 5.

FIGS. 5 and 6 provide top-views depicting an alignment substrate 90 (FIG. 5) and an exemplary free-space three-port WDM device 92 (FIG. 6). The WDM device 92 includes a filter 12, the alignment substrate 90, a common port collimator 96 that functions as a common port, a transmission port collimator 97 that functions as a transmission port, and a reflection port collimator 98 that functions as a reflection port. The alignment substrate 90 includes an upper surface 100, a cavity 102 that defines a lower surface 104 offset from the upper surface 100, and a plurality of alignment features ("aligners") 106 each comprising a groove (e.g., a V-shaped groove) having a distal end open to the cavity 102. The lower surface 104 may include visual alignment markings 108 indicative of a placement for the filter 12. Each aligner 106 may be configured to receive the collimating lens 72 of a respective collimator 96-98, and to align each collimator 96-98 so that the optical beam 86 follows a designed optical path 109 between the filter 12 and collimators 96-98. The aligners 106 may be fabricated, for example, using photolithography, high-precision milling, laser processing, or any other suitable technique.

The WDM device 92 represents a WDM device according to this disclosure in its simplest form. When operating in a demultiplexing mode, the optical beam 86 is launched from the common port collimator 96 towards the filter 12. A portion of the optical beam 86 may be transmitted by the filter 12 and received by the transmit port collimator 97. The remainder of the optical beam 86 may be reflected toward and received by the reflection port collimator 98. Both the collimators 96-98 and the aligners 106 can be made with high precision, so that only the filter 12 requires active alignment.

The optimal position and orientation of the filter 12 may be driven by the positions of the common and reflection port collimators 96, 98. However, variations of the surface curvature of the filters 12 may require active alignment of each filter 12. In cases where the position of the reflection port is fixed (such as depicted by FIG. 6), it may only be possible to optimize one of insertion loss or center wavelength shift at a time through alignment of the filter 12. In this type of WDM device, a compromise may be found that minimizes the impact on overall performance by balancing insertion loss and center wavelength shift. This type of filter arrangement may therefore be more suitable for CWDM than for DWDM since the filter bandwidth is much wider for CWDM, e.g., about 0.7 nm for DWDM vs. 20 nm for CWDM filters at full-width half-maximum. CWDM devices may therefore be more tolerant of center wavelength shift. To improve performance (e.g., for DWDM applications), an additional adjustable optical element such as a wedge or a lens (not shown) may be inserted into the optical path to provide an additional degree of freedom to the design.

Manufacturing tolerances of the filters 12 may be compensated for by active alignment of the filters 12. To optimize coupling between the optical beam 86 and the optical fiber 74 on the reflection port, the filter 12 may be moved laterally (as depicted by double arrowed line 88) and along the optical beam 86 (left-right as depicted by double arrowed line 89) without affecting the coupling between the optical beam 86 and the optical fiber 74 on the transmission port. Any rotation of the filter 12 may change the lateral shift position of the optical beam 86 in the plane of the transmission port, which can affect coupling between the optical beam 86 and optical fiber 74 at the transmission port.

Figure 7:
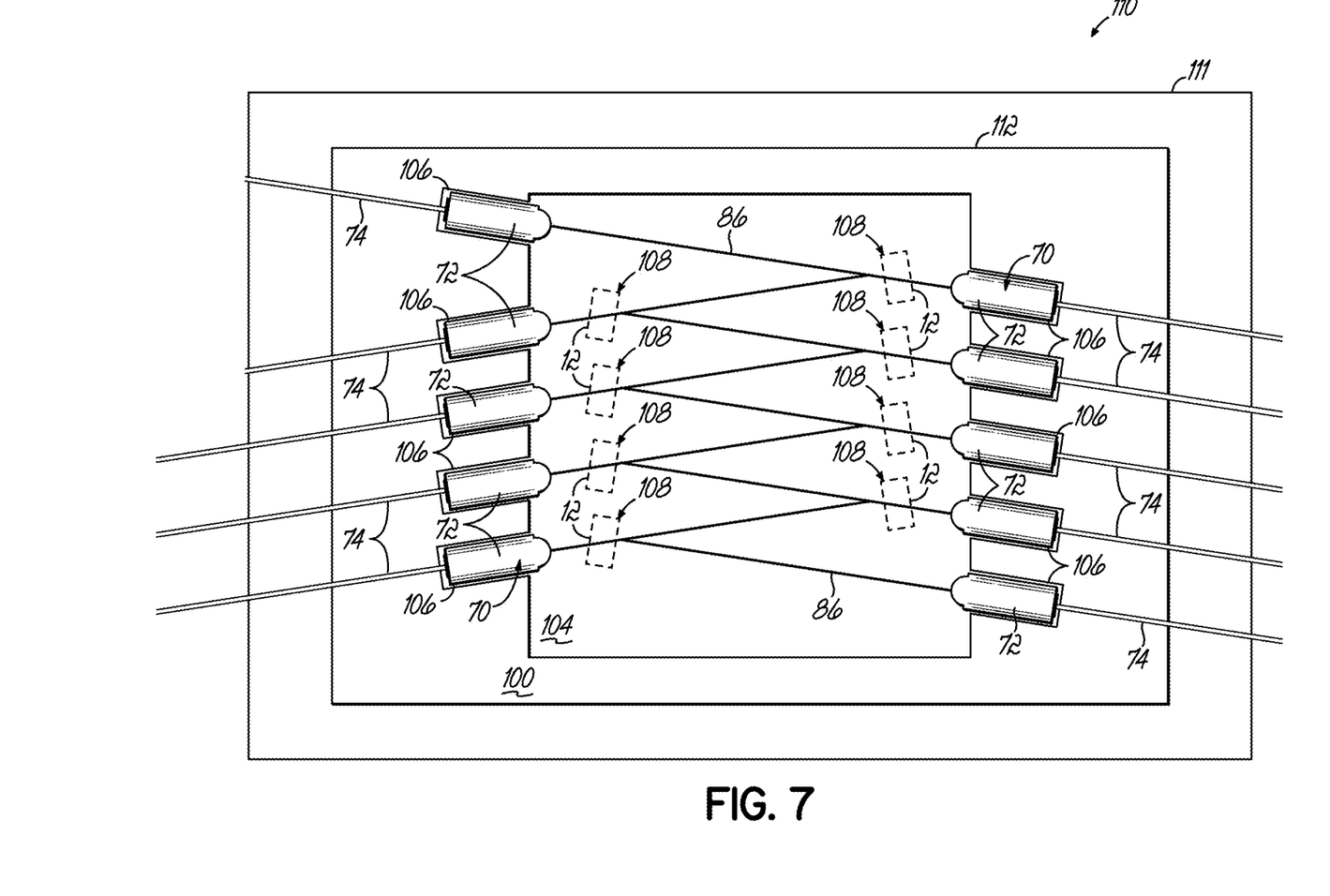
FIG. 7 is a diagrammatic view of a WDM device including another exemplary alignment substrate.

FIG. 7 depicts an exemplary free-space multi-port device 110 including a plurality of filters 12, collimators 70, a housing 111, and an alignment substrate 112 associated with the housing 111 and having a plurality of aligners 106 and visual alignment markings 108. The alignment substrate 112 may be associated with the housing 111, for example, by operatively coupling the alignment substrate 112 to the housing 111 (e.g., using fasteners or adhesive), or by forming alignment substrate 112 as an integral part of the housing 111 (e.g., by machining or molding the housing 111 and alignment substrate 112 as a single unit). For WDM devices in which the filters 12 are angled (such as depicted by FIGS. 6 and 7), the aligners 106 for the common and transmission port collimators 70 may be laterally shifted with respect to each other as the optical beam 86 experiences a lateral shift by refraction at the surfaces of the filters 12.

For a WDM device in which all the collimators have a working distance $d_{wD}=0$, the performance of the WDM device may be relatively tolerant to collimating lens alignment errors along the length of the optical path. That is, only the lateral position of the collimator lenses 72 may require high precision, which may be provided, for example, by linear indentations into the substrate (e.g., V-shaped grooves) or projections (e.g., parallel walls or linearly spaced pylons). High precision structures can be fabricated using photolithography, high-precision milling, laser processing, or any other suitable technique.

Figure 8:
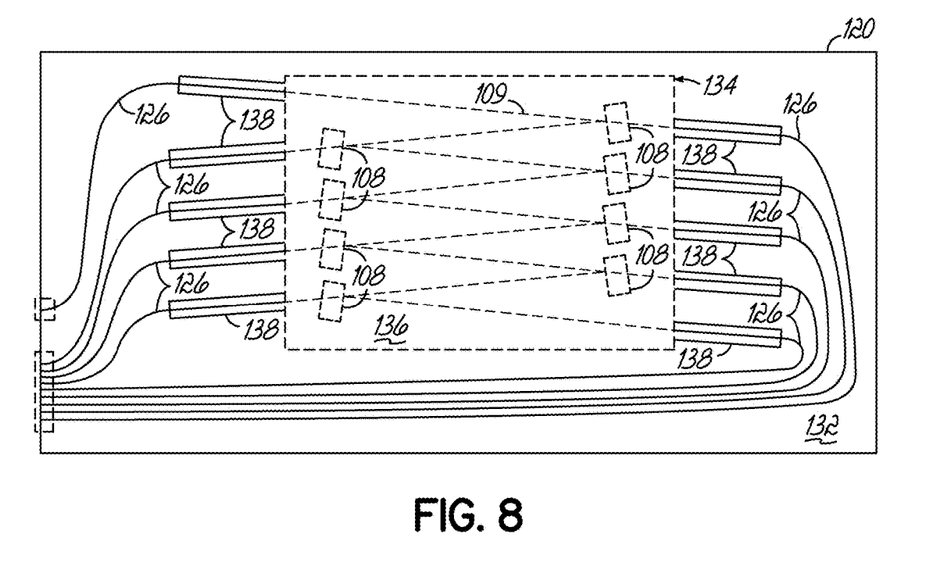
FIG. 8 is a diagrammatic view of another exemplary alignment substrate including a plurality of integrated optical waveguides and alignment grooves.
Figure 9:
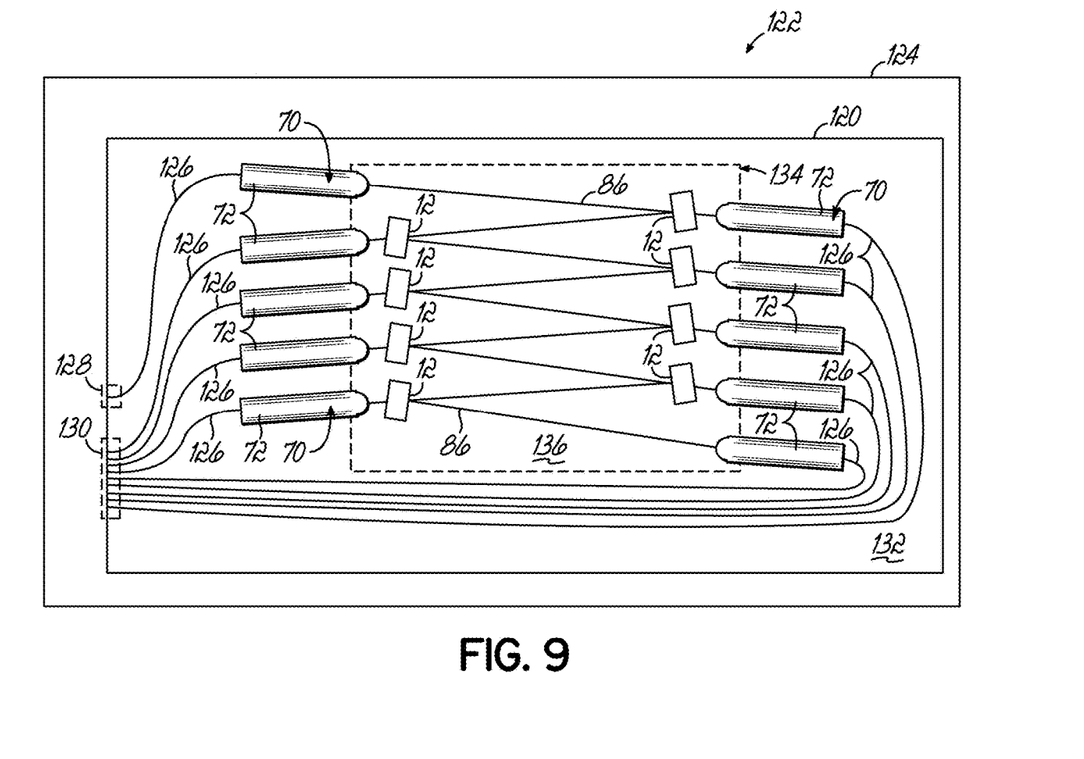
FIG. 9 is a diagrammatic view of a WDM device including the alignment substrate of FIG. 8.

FIGS. 8 and 9 provide top-views depicting an exemplary alignment substrate 120 (FIG. 8) and free-space multi-port WDM device 122 (FIG. 9). The WDM device 122 includes a plurality of filters 12, a plurality of collimating lenses 72, a housing 124 associated with the alignment substrate 120, and a plurality of integrated optical waveguides 126. Each integrated optical waveguide 126 may be configured to couple an optical beam comprising one or more optical signals between an optical connector 128, 130 and a respective collimating lens 72. The integrated optical waveguides 126 may be fabricated, for example, using a multi-step process including one or more sub-processes, such as deposition, photolithography, ion exchange, etching, or laser writing, or by any other suitable means. The alignment substrate 120 may include an upper surface 132, a cavity 134 that defines a lower surface 136 offset from the upper surface 132, and a plurality of aligners 138. Each aligner 138 may comprise a groove (e.g., a V-shaped groove) having a distal end open to the cavity 134.

Figure 10:
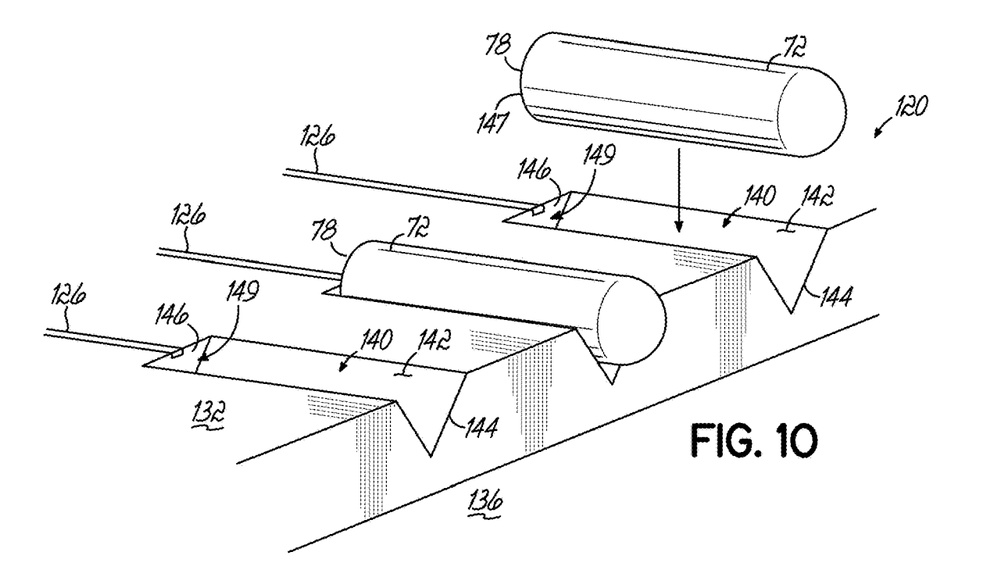
FIG. 10 is a perspective view of a portion of the alignment substrate of FIG. 8.

FIG. 10 is a perspective view of a portion of the alignment substrate 120 showing details of exemplary aligners 138. Each aligner 138 comprises a groove 140 including diagonal surfaces 142 arranged in a V-shape, an open end 144 facing the cavity 134, and a closed end 146 opposite the open end 144. The groove 140 may have a length such that, when the waveguide interface surface 78 of collimating lens 72 abuts the closed end 146 of groove 140, the collimating lens 72 is aligned linearly along the optical path of the WDM device 122. Thus, the interface surface 78 of collimating lens 72 may provide an abutment 147 and the closed end 146 of groove 140 may provide a stop 149. The abutment 147 and stop 149 may cooperate to position the collimating lens 72 along the designed optical path 109 when the abutment 147 of the collimating lens 72 is in contact with the stop 149 of the aligner 138. The diagonal surfaces 142 of the groove 140 are configured to position the collimating lens 72 so that its optical axis 75 is aligned laterally (vertically and horizontally) and angularly with both the end face of the integrated optical waveguide 126 associated with the aligner 138 and the optical path of WDM device 122. This placement may be achieved through contact between the diagonal surfaces 142 of groove 140 and the cylindrical surface 76 of collimating lens 72.

Figure 11:
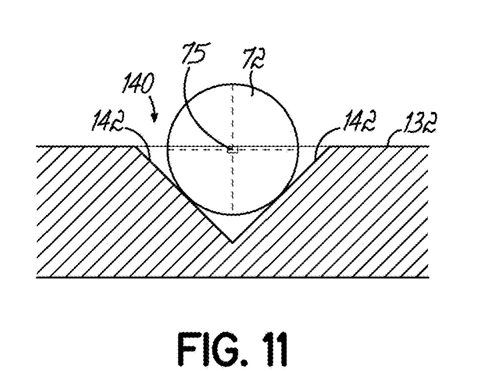
FIGS. 11-14 are cross-sectional views of various exemplary grooves that may be used in the alignment substrates of FIGS. 5 and 8.
Figure 12:
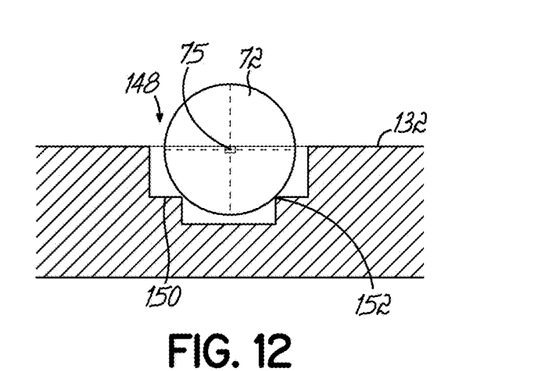

FIGS. 11 and 12 provide cross-sectional views of the V-shaped groove 140 and an exemplary stepped groove 148. The stepped groove 148 includes steps 150 each having a corner 152 that supports the culminating lens 72. Each of the grooves 140, 148 is configured to position the collimating lens 72 vertically and horizontally through contact with its cylindrical surface 76 such that the optical axis 75 of the collimating lens 72 is aligned with both the integrated optical waveguide 126 and the optical path. This alignment may be accomplished by configuring each groove 140, 148 to contact the cylindrical surface 76 of collimating lens 72 along two points of contact, e.g., lines of contact with the diagonal surfaces 142 of groove 140 or the corners 152 of each step 150 of groove 148.

Figure 13:
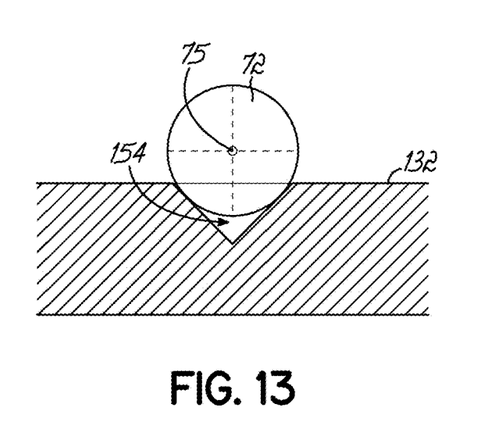
Figure 14:
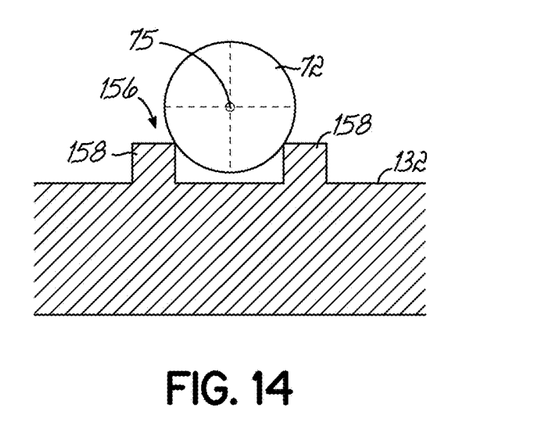

FIGS. 13 and 14 provide cross-sectional views of another V-shaped groove 154 and an exemplary raised groove 156. The raised groove 156 may comprise a pair of parallel steps 158 that project upward from the upper surface 132 of alignment substrate 120. Each of the grooves 154, 156 is configured to position the collimating lens 72 vertically and horizontally through contact with its cylindrical surface 76 so that the optical axis 75 of the collimating lens 72 is above the upper surface 132 of alignment substrate 120. This may provide clearance to accommodate the optical fiber 74 for embodiments in which the optical fiber 74 is directly coupled to the waveguide interface surface 78 of collimating lens 72. This raised vertical positioning of the collimating lenses 72 may also allow omission of the cavity 102 by raising the optical path of the WDM device 122 above the upper surface 132 of alignment substrate 120.

Figure 15A:
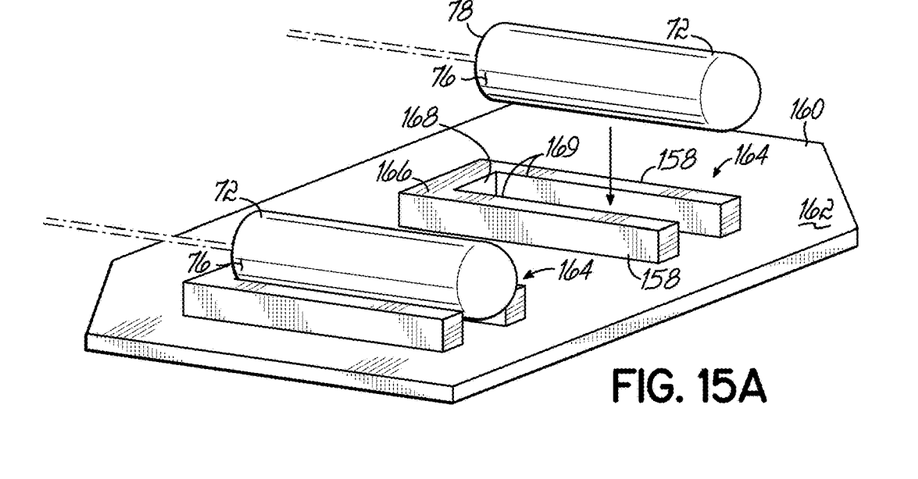
Figure 15B:
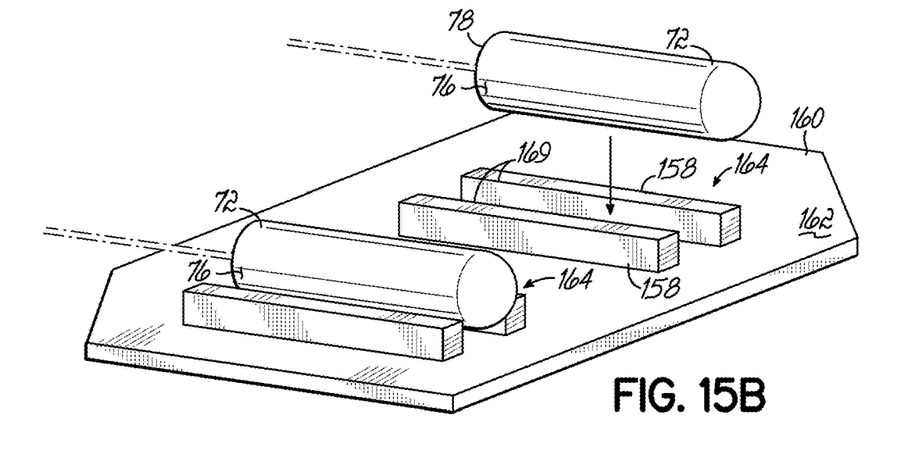

FIGS. 15A and 15B are perspective views of a portion of two embodiments of an alignment substrate 160 including a top surface 162 and exemplary aligners 164 each including the raised groove 156 of FIG. 14. Each aligner 164 may include a pair of parallel steps 158, with the embodiment depicted by FIG. 15A also including a cross-step 166 that joins the proximal ends of the parallel steps 158. When present, the cross-step 166 may provide a stop 168 that aligns the collimating lens 72 along the predetermined optical path of the optical beam 86. Each parallel step 158 may provide a point of contact 169 in the form of an edge that contacts the cylindrical surface 76 of collimating lens 72.

Figure 16:
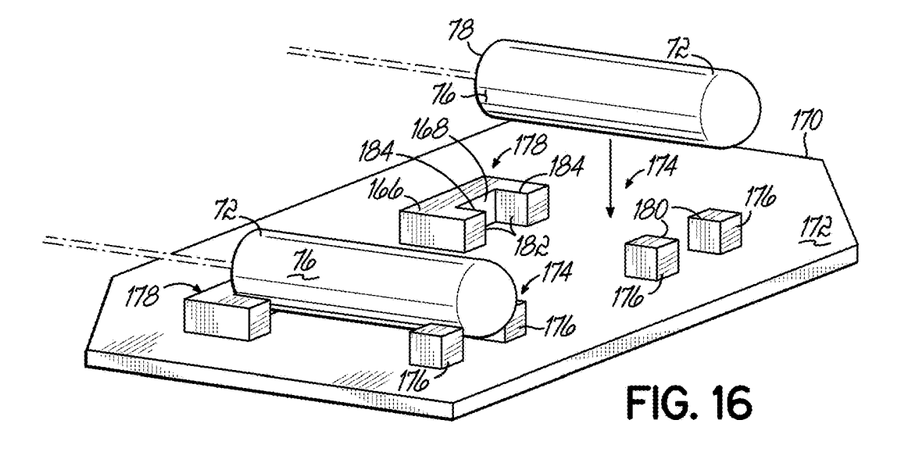

FIG. 16 is a perspective view of a portion of an alignment substrate 170 including a top surface 172 and exemplary aligners 174 having a similar configuration as the aligners 164 of FIG. 15A, but with a portion of each parallel step 158 between the proximal and distal ends thereof omitted. The resulting aligner 174 includes a pair of forward supports 176 and a rear support 178. Each forward support 176 may comprise a column that projects upward from the top surface 172 of alignment substrate 170, and which provides a point of contact 180 with the cylindrical surface 76 of collimating lens 72. The forward supports 176 may thereby cradle a portion of the cylindrical surface 76 of collimating lens 72 proximate the air interface surface 80 thereof. The rear support 178 may include the cross-step 166 of FIG. 15A to align the collimating lens 72 along the optical path, and projections 182 each providing a point of contact 184 with the cylindrical surface 76 of collimating lens 72. The projections 182 may operate cooperatively with the forward supports 176 to define the orientation of the collimating lens 72 such that the optical axis 75 thereof is aligned with the optical path.

Figure 17A:
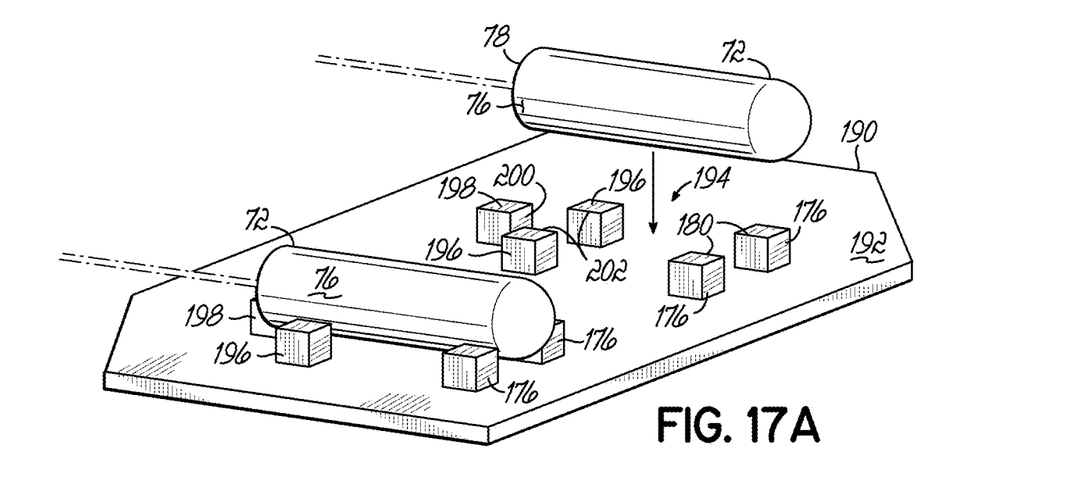
Figure 17B:
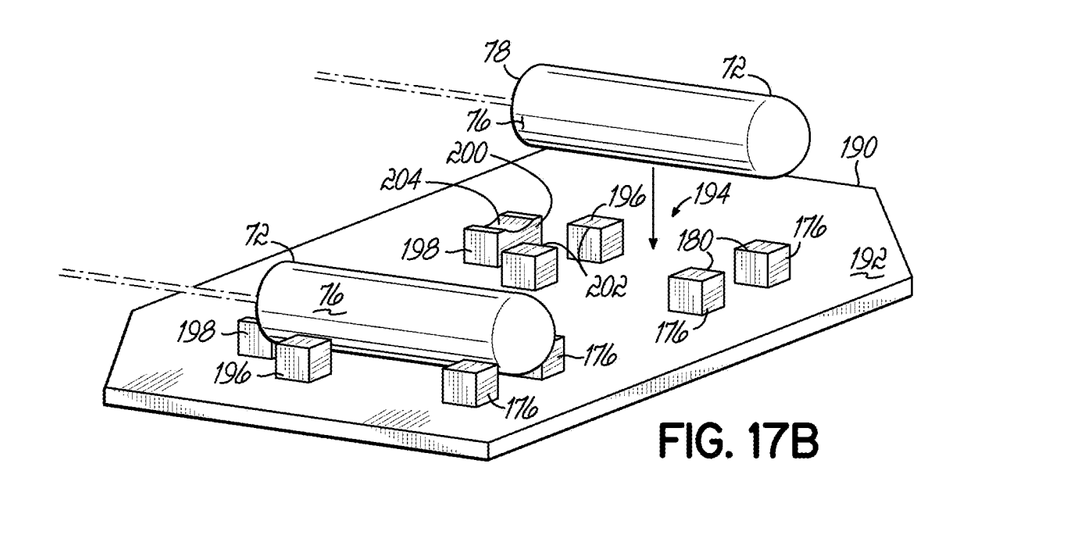
Figure 17C:
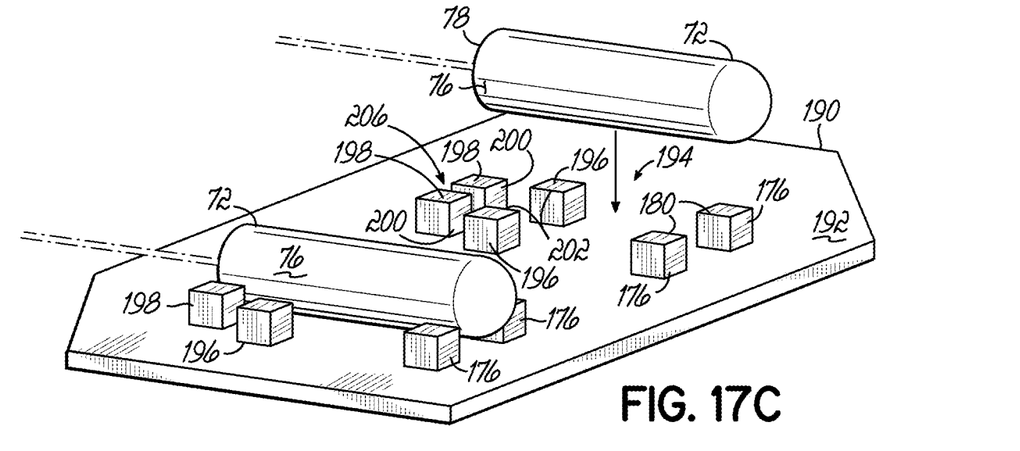
Figure 17D:
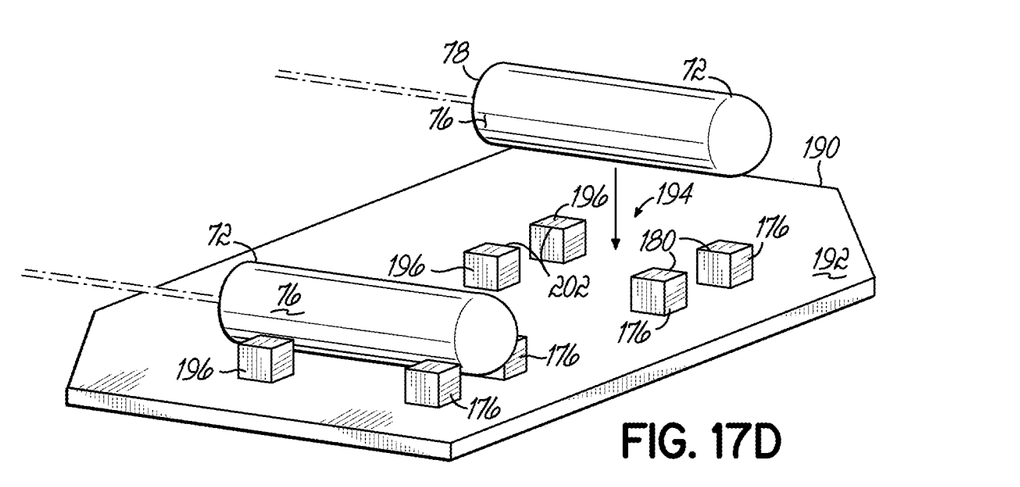

FIGS. 17A-17D are perspective views of a portion of an alignment substrate 190 including a top surface 192 and exemplary aligners 194. Each aligner 194 includes a plurality of supports, including the forward supports 176 and rear supports 196. Each rear support 196 comprises a column that projects upward from the top surface 192 of alignment substrate 190 and which provides a point of contact 202 with the cylindrical surface 76 of collimating lens 72. The embodiments depicted by FIGS. 17A-17C also include one or more stops 198. Each stop 198 provides a surface 200 which aligns the collimating lens 72 along the predetermined optical path. The stop 198 of FIG. 17B includes a groove 204 (e.g., a U-shaped groove) to accommodate the optical fiber 74 and/or the adhesive 82 depicted by FIG. 4. The stops 198 depicted by FIG. 17C are arranged to provide a gap 206 between the stops 198 to accommodate the optical fiber 74 and/or adhesive 82.

Advantages provided by aligner substrates may include simplification of the free-space WDM device assembly (thereby reducing the required assembly time), elimination of the need for active collimator alignment, lower WDM device cost, reduced component cost (e.g., simplified collimators), reduced WDM device size, and elimination of the need to accommodate optical fiber bend radiuses for embodiments using integrated optical waveguides 126.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A wavelength division multiplexing device, comprising:
    a housing;
    a designed optical path at least partially contained within the housing;
    an alignment substrate associated with the housing; and
    a plurality of collimating lenses each having a waveguide interface surface, an air interface surface, and a collimator optical axis,
    wherein the alignment substrate includes:
        an upper surface having plurality of integrated optical waveguides each fabricated in the upper surface and including an end face with a waveguide optical axis, and a plurality of aligners each fabricated in the alignment substrate associated with the end face of a respective integrated optical waveguide of the plurality of integrated optical waveguides, and configured to receive a respective collimating lens of the plurality of collimating lenses such that when the respective collimating lens is received in the aligner, the aligner aligns the collimator optical axis with the designed optical path at the air interface surface and with the waveguide optical axis of the end face of the respective integrated optical waveguide at the waveguide interface surface.

2. The wavelength division multiplexing device of claim 1, wherein each of the plurality of aligners includes a groove formed in the upper surface of the alignment substrate.

3. The wavelength division multiplexing device of claim 2, wherein the groove is V-shaped or U-shaped.

4. The wavelength division multiplexing device of claim 2, wherein:
    the alignment substrate further includes a cavity in the upper surface that defines a lower surface,
    each groove formed in the upper surface of the alignment substrate includes an open end facing the cavity, and
    at least a portion of the designed optical path passes through the cavity.

5. The wavelength division multiplexing device of claim 1, wherein:
    the alignment substrate includes a lower surface offset from the upper surface, and
    each of the plurality of aligners includes one or more projections extending from the lower surface such that the collimator optical axis of the respective collimating lens is elevated above the lower surface of the alignment substrate.

6. The wavelength division multiplexing device of claim 1, wherein:
    each of the plurality of collimating lenses includes an abutment,
    each of the plurality of aligners includes a stop, and
    each of the plurality of collimating lenses is placed in a respective predetermined position along the designed optical path when the abutment of the collimating lens is in contact with the stop of the aligner.

7. The wavelength division multiplexing device of claim 1, further comprising:
    at least one filter that defines an actual optical path for an optical beam,
    wherein the at least one filter is configured to receive the optical beam from a first collimating lens of the plurality of collimating lenses, transmit at least a first portion of the optical beam toward a second collimating lens of the plurality of collimating lenses, and reflect at least a second portion of the optical beam toward a third collimating lens of the plurality of collimating lenses.

8. The wavelength division multiplexing device of claim 7, wherein the alignment substrate further includes one or more alignment markings that provide an indication of a placement of the at least one filter on the alignment substrate such that the actual optical path of the optical beam is aligned with the designed optical path.

9. A method of making a wavelength division multiplexing device including a plurality of collimating lenses each having a waveguide interface surface, an air interface surface, and a collimator optical axis aligned with a designed optical path, the method comprising:
    providing an alignment substrate including an upper surface;
    fabricating a plurality of integrated optical waveguides in the upper surface of the alignment substrate each including an end face with a waveguide optical axis;

fabricating a plurality of aligners in the upper surface of the alignment substrate, each of the plurality of aligners associated with the end face of a respective integrated optical waveguide of the plurality of integrated optical waveguides, and configured to receive a respective collimating lens of the plurality of collimating lenses such that when the respective collimating lens is received in the aligner, the aligner aligns the collimator optical axis with the designed optical path at the air interface surface and with the waveguide optical axis of the end face of the respective integrated optical waveguide at the waveguide interface surface; and placing each of the plurality of collimating lenses in a respective aligner of the plurality of aligners.

10. The method of claim 9, wherein each collimating lens of the plurality of collimating lenses includes an abutment, each aligner of the plurality of aligners includes a stop, and the method further comprises:

abutting the abutment of the respective collimating lens with the stop of the respective aligner, wherein abutting the abutment with the stop positions the respective collimating lens along the designed optical path.

11. The method of claim 9, further comprising:

placing at least one filter that defines an actual optical path for an optical beam on the alignment substrate, wherein the at least one filter is configured to receive the optical beam from a first collimating lens of the plurality of collimating lenses, transmit at least a first portion of the optical beam toward a second collimating lens of the plurality of collimating lenses, and reflect at least a second portion of the optical beam toward a third collimating lens of the plurality of collimating lenses.

12. The method of claim 11, wherein the alignment substrate further includes one or more alignment markings that provide an indication of a placement of the at least one filter on the alignment substrate such that the actual optical path of the optical beam is aligned with the designed optical path, and further comprising:

aligning the at least one filter with a respective alignment mark of the one or more alignment marks.

13. The method of claim 9, wherein the alignment substrate further includes a cavity in the upper surface that defines a lower surface, and at least a portion of the designed optical path passes through the cavity.

* * * * *